US011542716B2

(12) United States Patent
Stockinger et al.

(10) Patent No.: US 11,542,716 B2
(45) Date of Patent: Jan. 3, 2023

(54) ARTIFICIAL SURFING SYSTEM

(71) Applicant: Stefan Stockinger, Vienna (AT)

(72) Inventors: Stefan Stockinger, Vienna (AT); Boris Huber, Vienna (AT); Michael Strömer, Graz (AT)

(73) Assignee: UPSURFDOWN GMBH, Vienna (AT)

( * ) Notice: Subject to any disclaimer, the term of this patent is extended or adjusted under 35 U.S.C. 154(b) by 332 days.

(21) Appl. No.: 16/649,829

(22) PCT Filed: Sep. 25, 2018

(86) PCT No.: PCT/AT2018/000079
§ 371 (c)(1),
(2) Date: Mar. 23, 2020

(87) PCT Pub. No.: WO2019/056028
PCT Pub. Date: Mar. 28, 2019

(65) Prior Publication Data
US 2020/0284057 A1    Sep. 10, 2020

(30) Foreign Application Priority Data

Sep. 25, 2017  (AT) .............................. A 60097/2017
Oct. 2, 2017   (AT) .............................. A 60103/2017
(Continued)

(51) Int. Cl.
*G09B 19/00*   (2006.01)
*E04H 4/00*    (2006.01)
*A63B 69/00*   (2006.01)

(52) U.S. Cl.
CPC ....... *E04H 4/0006* (2013.01); *A63B 69/0093* (2013.01); *A63B 2209/00* (2013.01)

(58) Field of Classification Search
CPC ...... G09B 19/0038; E04H 4/00; E04H 4/0006
(Continued)

(56) References Cited

U.S. PATENT DOCUMENTS 4,692,949 A * 9/1987 Dunn ................... E04H 4/0006
                                                4/491
4,954,014 A * 9/1990 Sauerbier ............. E04H 4/0006
                                                4/491
(Continued)

FOREIGN PATENT DOCUMENTS

| EP | 2356298 B1    | 8/2011  |
|----|---------------|---------|
| WO | 2005/033444 A1 | 4/2005  |
| WO | 2009/064445 A1 | 11/2008 |

OTHER PUBLICATIONS

International Search Report dated Jan. 10, 2019 issued in corresponding International Application No. PCT/AT2018/000079 with English translation (4 pages).

*Primary Examiner* — Kurt Fernstrom
(74) *Attorney, Agent, or Firm* — Pillsbury Winthrop Shaw Pittman, LLP

(57) ABSTRACT

In an artificial surfing system for generating a standing wave, comprising a water circuit, in which a first wave generating device is arranged, which comprises a wave pool and a ramp arranged upstream of the wave pool, over which the water flows down into the wave pool, wherein the water circuit downstream of the wave pool of the first wave generating device comprises a water backflow, via which the water is made available to a pump with which the water can be conveyed from the backflow upwards to the first wave generating device, at least one further wave generating device is arranged in the backflow, to which the water coming from the first wave generating device flows.

10 Claims, 3 Drawing Sheets

(30) Foreign Application Priority Data

Nov. 14, 2017 (AT) .................. A 445/2017
Jan. 29, 2018 (AT) .................. A 60022/2018

(58) Field of Classification Search
USPC .......................... 434/247, 254, 255
See application file for complete search history.

(56) References Cited

U.S. PATENT DOCUMENTS

| | | | | |
|---|---|---|---|---|
| 6,912,738 | B2* | 7/2005 | Black | E04H 4/0006 |
| | | | | 4/491 |
| 6,920,651 | B2* | 7/2005 | Roberts | E04H 4/0006 |
| | | | | 4/491 |
| 8,262,316 | B2* | 9/2012 | Slater | A47K 3/10 |
| | | | | 4/491 |
| 8,375,477 | B2* | 2/2013 | Johnson | E04H 4/0006 |
| | | | | 4/491 |
| 8,496,403 | B2* | 7/2013 | Lochtefeld | E04H 4/0006 |
| | | | | 4/491 |
| 8,516,624 | B2* | 8/2013 | Klimaschewski | E04H 4/0006 |
| | | | | 4/491 |
| 9,044,685 | B2* | 6/2015 | Alleshouse | A63G 31/007 |
| 9,068,371 | B2* | 6/2015 | McFarland | E04H 4/0006 |
| 9,457,290 | B2* | 10/2016 | Hill | A63H 33/42 |
| 9,802,133 | B2* | 10/2017 | Parlane | E04H 4/0012 |
| 10,119,285 | B2* | 11/2018 | Perslow | F04D 35/00 |
| 10,597,884 | B2* | 3/2020 | Fincham | A63B 69/0093 |
| 2008/0286048 | A1* | 11/2008 | Carnahan | A63B 69/0093 |
| | | | | 405/79 |
| 2009/0151064 | A1* | 6/2009 | Mladick | E04H 4/0006 |
| | | | | 4/491 |
| 2009/0185863 | A1 | 7/2009 | McFarland | |
| 2010/0088814 | A1* | 4/2010 | Johnson | F04D 35/00 |
| | | | | 4/491 |
| 2012/0183353 | A1* | 7/2012 | Davis | A63G 31/007 |
| | | | | 405/79 |
| 2013/0074254 | A1* | 3/2013 | Payne | E04H 4/0006 |
| | | | | 4/491 |
| 2013/0130815 | A1* | 5/2013 | Lochtefeld | A63G 31/16 |
| | | | | 472/128 |

* cited by examiner

ARTIFICIAL SURFING SYSTEM

CROSS REFERENCE TO RELATED APPLICATIONS

This application is the U.S. National Stage of PCT/AT2018/000079, filed Sep. 25, 2018, which claims priority to: Austrian Patent Application No. A 60097/2017, filed Sep. 25, 2017, Austrian Patent Application No. A 60103/2017, filed Oct. 2, 2017, Austrian Patent Application No. A 445/2017, filed Nov. 14, 2017, and Austrian Patent Application No. A 60022/2018, filed Jan. 29, 2018, the entire contents of each of which are herein incorporated by reference in their entireties.

BACKGROUND OF THE INVENTION

Field of the Invention

The invention relates to an artificial surfing system for generating a standing wave comprising a water circuit, in which a first wave generating device is arranged, which comprises a wave pool and a ramp upstream of the wave pool, over which the water flows down into the wave pool, wherein the water circuit downstream of the wave pool of the first wave generating device comprises a water backflow, via which the water is made available to a pump with which the water can be conveyed up from the backflow upwards to the first wave generating device.

Description of Related Art

Artificial surfing systems for generating a standing wave are known for example from EP 2356298 B1. In the known device, the water is circulated in a closed system, the water being first pumped to the level of the upper end of the ramp of the wave generating device, flowing down the ramp and forming a standing wave in the wave pool. The water flowing out of the wave pool flows via a backflow to the suction area of the pump, so that the circuit can start again. In the embodiment described in EP 2356298 B1, the wave generating device including the wave pool is arranged in a main pool surrounding it, so that the water flowing out of the wave pool reaches the main pool. In the main pool, the water flows below the wave pool back to the suction area of the pump. For design reasons, the main pool must be arranged at a relatively large distance below the wave pool, so that the water flowing out of the wave pool is led over a correspondingly high drop height. The potential energy of water is converted into kinetic energy, which, however, cannot be used purposefully, so that energy is "lost". The main disadvantage here is that the water has to be raised from the level of the main pool to the level of the upper end of the ramp under great use of energy for the pump(s) provided for this purpose. Due to the volume flow required for the operation of an artificial surfing system, the energy consumption of the pump(s) is extremely large and represents a significant cost factor. The volume flow itself cannot simply be reduced without reducing the size of the wave pool and thus the useful capacity of the artificial surfing system, i.e. the number of surfers who can simultaneously use the system.

SUMMARY

The invention therefore aims to reduce the energy consumption for the operation of an artificial surfing system in relation to the usage capacity.

To achieve this object, the invention essentially provides in an artificial surfing system of the initially mentioned kind, wherein at least one further wave generating device is arranged in the backflow, to which the water coming from the first wave generating device flows. The fact that the returning water is used in at least one further wave generating device for the provision of a standing wave allows the capacity of the overall system to be increased without increasing the energy input for the operation of the pump(s). In particular, the otherwise lost potential energy of the water is used in the at least one further wave generating device. The water leaving the first wave generating device is conveyed to the at least one further wave generating device exclusively on the basis of the flow of the water moving in the circuit, so that no additional pumps are required which have to bring the water to a higher level. The upstream end of the further wave generating device is therefore at a lower level than the water level at the downstream end of the first wave generating device.

The configuration is preferably such that the entire amount of water in the backflow is passed through the at least one further wave generating device.

According to the invention, the artificial surfing system is designed in such a way that the water in the water circuit flows through at least two wave generating devices in succession. The water can flow through two, three or more wave generating devices in succession until it reaches the suction area of the pump(s), which pumps the water back up to the first wave generating device.

The water circuit is preferably designed as a closed circuit.

A particularly space-saving design is achieved according to a preferred embodiment of the invention in that the water circuit between the first wave generating device and the at least one further wave generating device comprises deflecting means for deflecting the water by at least 90°, in particular by approximately 180°. In this context, it is preferably provided that the first wave generating device and the further wave generating device are arranged side by side. The flow direction of the water in the first wave generating device and in the further wave generating device is in the opposite direction.

If the first and the further wave generating device are arranged directly next to one another in order to achieve a particularly space-saving design, it is preferably provided that the first and the further wave generating device are separated from one another by a partition wall. The partition wall can comprise a walkable footbridge.

If, as corresponds to a preferred embodiment, the first and the at least one further wave generating device operate according to the same wave generating principle, the at least one further wave generating device also comprises a wave pool and a ramp upstream of the wave pool, over which the water flows down into the wave pool.

The generation of the standing wave in the wave pool is based on the principle that fast water flowing down the ramp meets the slow water present in the pool. In order to be able to set the resistance which the slow water opposes to the fast water and in order to be thus able to influence the wave formation, it is preferably provided that the wave pool of the first wave generation device and/or the wave pool of the at least one further wave generation device comprises an adjustable weir for adjusting the water level in the pool. The weir preferably forms the downstream boundary of the wave pool. The weir is preferably designed as a pivotable flap, the water level in the pool being adjustable as a function of the pivoting angle. The pivotable flap is also preferably designed to be pivoted into an essentially horizontal position if necessary, as a result of which the accumulation effect is lost and the wave generation is reduced or ceases. Users of the system having an accident or having fallen can thereby easily be given the opportunity to leave the wave pool.

It is preferably provided that the ramp of the first wave generating device is arranged higher than the ramp of the at least one further wave generating device. It is preferably provided that the wave pool of the first wave generation device is arranged higher than the wave pool of the at least one further wave generation device.

The drop height of the ramp of the at least one further wave generating device can be greater or less than the drop height of the wave pool of the first wave generating device.

The wave pool is preferably designed with a rectangular layout. The length of the pool measured in the direction of flow is preferably greater than the width of the pool measured transversely thereto. The pool width is preferably 6-12 m. The length of the ramp leading into the wave pool is preferably 1.5-3 m. The pool length is preferably 7-10 m. The impact surface leading into the wave pool is preferably 0.75-2 m. The wave pool is preferably designed for a water level of 0.4-1.5 m, in particular with the aid of the adjustable weir, in particular the pivotable flap. The total length of the surfing system, i.e. the total length of the main pool, can be 25-40 m, preferably approximately 30 m.

In order to be able to influence the waveform, a spoiler with a variable angle of attack, for example, can be arranged at the lower end of the impact surface.

If the total amount of water in the backflow is passed through the at least one further wave generating device, the volume flow in the first and in the at least one further wave generating device is the same. If, however, the water gradient usable in the at least one further wave generating device is less than in the first wave generating device, it may make sense to dimension the at least one further wave generating device smaller than the first wave generating device, so that a satisfactory wave formation occurs despite a smaller gradient. In particular, it can be provided here that the width and/or length of the wave pool of the at least one further wave generating device is less than the width or length of the wave pool of the first wave generating device.

According to a preferred embodiment of the present invention, the surfing system is preferably further developed in such a way that the backflow is arranged on both sides of the first wave generating device and a further wave generating device is each arranged in the backflow on both sides of the first wave generating device. This represents a further improvement in the usage capacity of the surfing system according to the invention and can be implemented without changing the basic concept in order to further improve the efficiency and the achievable capacity.

So far, only wave generating devices capable of generating waves that are substantially orthogonal to the flow direction of the water have been disclosed. However, it is desirable to be able to simulate waves that are surfed from left to right or vice versa, similar to natural left- or right-breaking waves. For this purpose, the impact surface of the first and/or of the at least one further wave generating device is inclined with respect to the direction of flow of the water circuit, as corresponds to a preferred embodiment of the present invention. In this preferred case, the fast water flowing down the ramp meets the slow water in the wave pool along a sloping front and, depending on whether the ramp surface is slanted to the left or to the right, forms a wavefront sloping to the left or to the right, which is accordingly less surfed on the rear of a surfboard, but more on the rails. The impact surface of a wave generating device is preferably adjustable obliquely with respect to the flow direction of the water circuit.

In order to meet the increasing demand for alternative winter sport attractions in winter sports areas, the present invention can preferably also be carried out in such a way that the surfing system is made of snow. With appropriate external conditions, the cooling requirement is relatively low in order to preserve the snow or the resulting ice, wherein advantageous hydrodynamic conditions are reached in the surfing system, due to the initial erosion of the snow by the water flowing over it, and the waves, such as in the nature, are subject to a certain variability.

BRIEF DESCRIPTION OF THE DRAWINGS

The invention is explained in more detail below on the basis of an exemplary embodiment schematically illustrated in the drawing.

DETAILED DESCRIPTION

Figure 1:
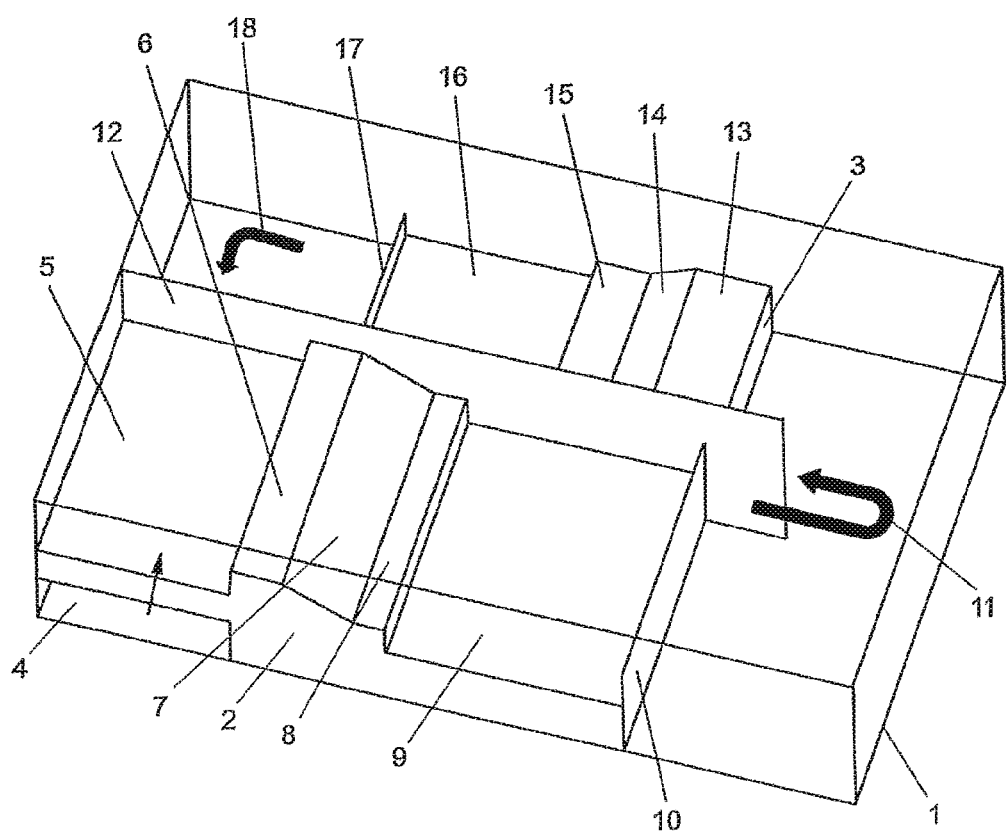
FIG. 1 shows a perspective view of an artificial surfing system.

In FIG. 1, a main pool is designated 1, which is filled with water during operation. A first wave generating device 2 and a second wave generating device 3 are arranged in the main pool 1. The water arranged in the main pool 1 is pumped up with the aid of a plurality of pumps, not shown, from an intake area 4 arranged upstream of the first wave generating device 2 into a collecting pool 5 of the first wave generating device 2. From there, the water flows into the wave pool 9 via the inlet area 6, the ramp 7 and an impact surface 8 directly adjoining the ramp 7. The wave pool is delimited on the downstream side by a pivotable flap 10. The water flowing off via the pivotable flap 10 is diverted by 180° in accordance with the arrow 11 and flows to the second wave generating device 3 separated from the first wave generating device 2 via a partition wall 12. The individual sections of the second wave generating device 3 lie lower than the corresponding sections of the first wave generating device 2. The second wave generating device 3 is constructed in the same way as the first wave generating device 2 and therefore comprises an inlet area 13, a ramp 14, an impact surface 15 directly adjoining the ramp 14 and the wave pool 16. The wave pool 16 is delimited on the downstream side by a pivotable flap 17. The water flowing off via the pivotable flap 17 arrives according to the arrow 18 in the suction area 4 of the pumps, which is located below the collecting pool 5.

In order to make it easier for the user to get out of the wave pool 9, an exit aid, such as, for example, a water-permeable climbing grid leading obliquely to the pool edge or to the weir 17, can be arranged in the wave pool 9.

Figure 2:
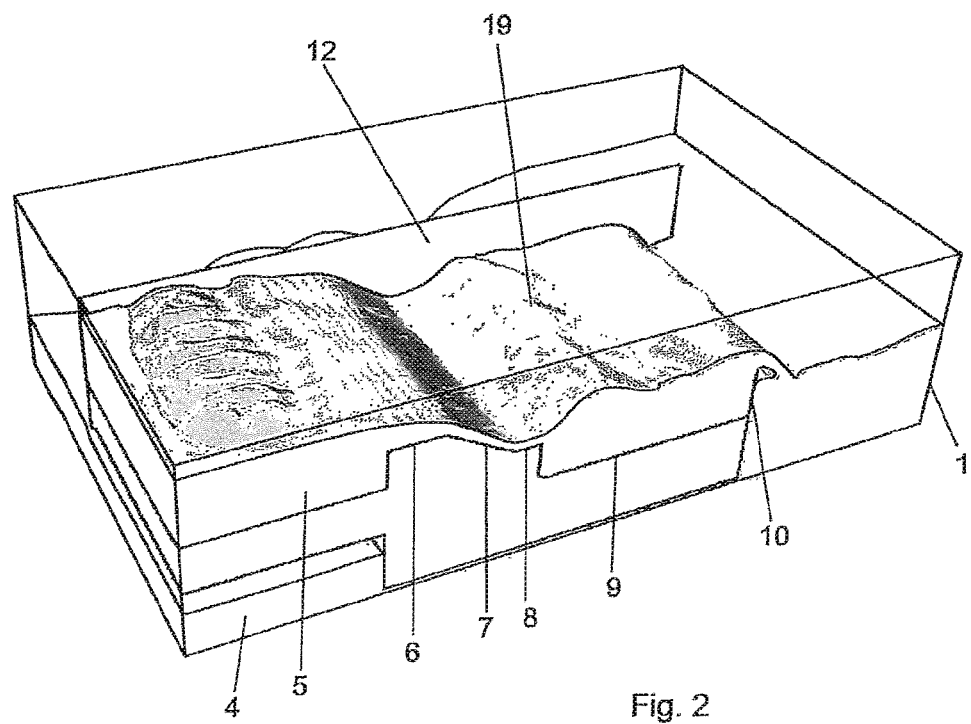
FIG. 2 shows the surfing system according to FIG. 1 with a visualization of the water level curve in a first view.
Figure 3:
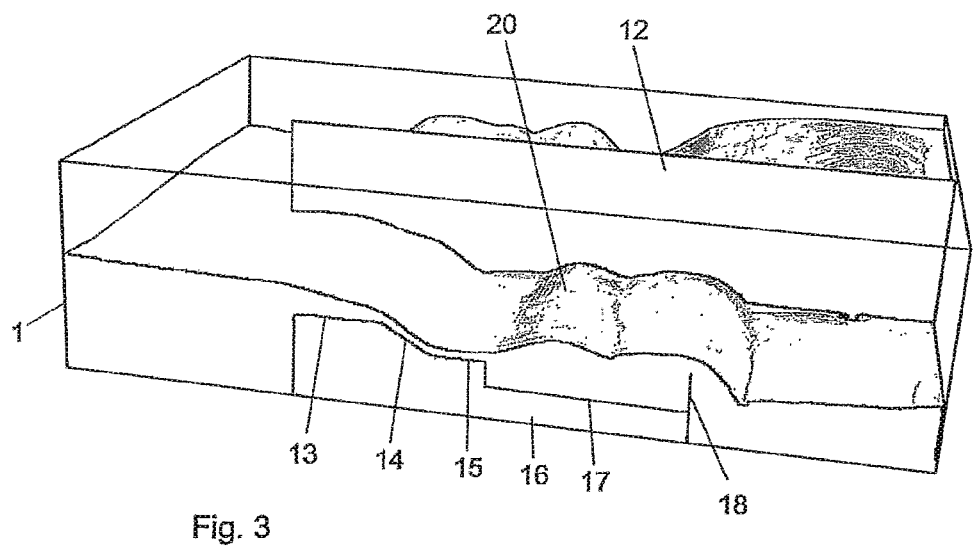
FIG. 3 shows the surfing system according to FIG. 1 with a visualization of the water level curve in a second view and FIG. 4 shows the surfing system with a backflow on both sides of the first wave generating device.

In FIGS. 2 and 3, a visualization of the water is shown, wherein it can be seen that the water in the wave pool 9 of the first wave generating device 2 forms a standing wave 19 and in the second wave generating device 3 a standing wave 20.

Figure 4:
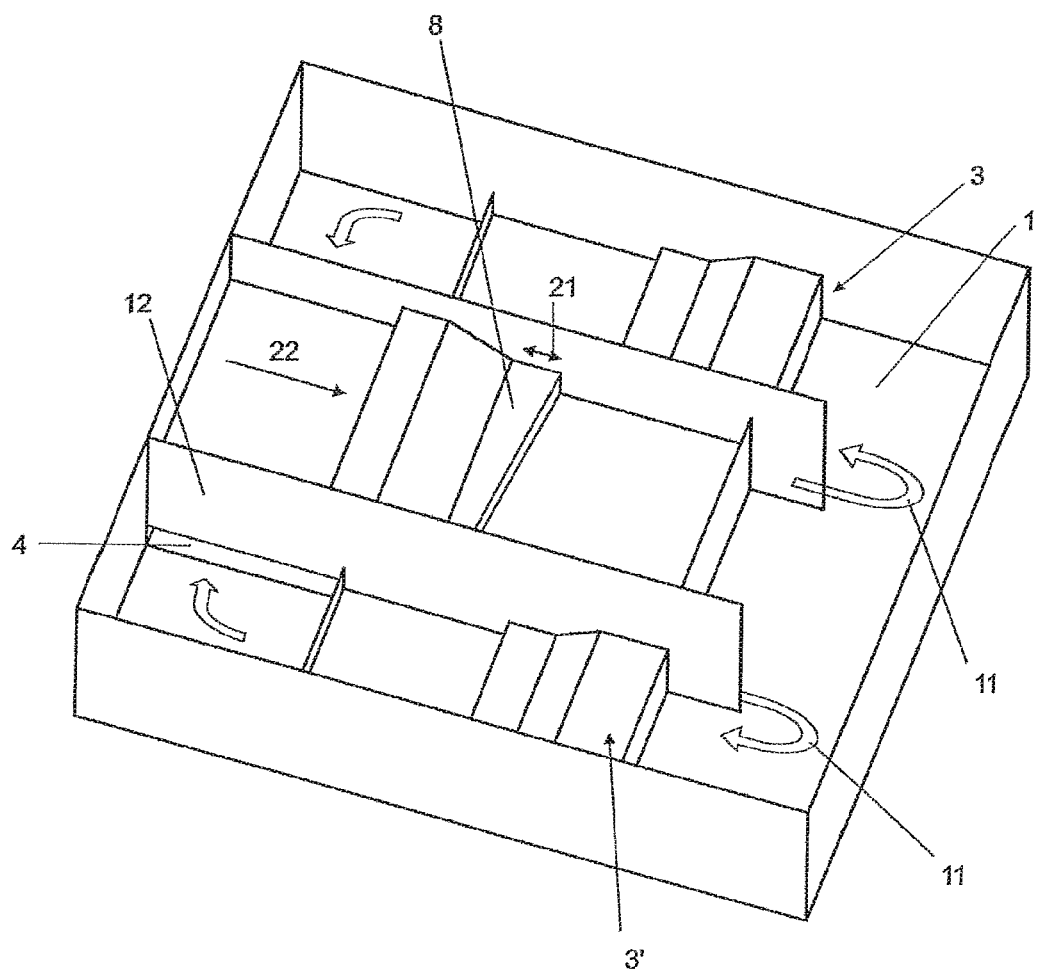

In FIG. 4, same parts are denoted by same reference numerals and it can be seen that the water flowing out of the main pool 1 is deflected by 180° in accordance with the two arrows 11 and is directed to backflows on both sides of the first wave generating device 2. There, a wave generating device 3 and 3' is arranged on both sides of the first wave generating device 2. In the example shown in FIG. 4, the two wave generating devices 3 and 3' are designed identically, but these can differ from one another in their geometry in order to achieve different wave characteristics.

In FIG. 4 it can also be seen that the impact surface 8 of the first wave generating device 2 is inclined relative to the flow direction of the water circuit symbolized by the arrow 21 and can also be adjusted obliquely according to the arrow 22 in order to generate waves which resemble natural left- or right-breaking waves.

The invention claimed is:

1. An artificial surfing system for generating a standing wave comprising a water circuit in which a first wave generating device is arranged, which comprises a wave pool and a ramp arranged upstream of the wave pool, over which water flows down into the wave pool, wherein the water circuit downstream of the wave of the first wave generating device comprises a water backflow, via which the water is made available to a pump with which the water can be conveyed from the water backflow upwards to the first wave generating device, characterized, in that at least one further wave generating device is arranged in the water backflow, to which the water coming from the first wave generating device flows.

2. The surfing system according to claim 1, characterized in that the water circuit between the first wave generating device and the at least one further wave generating device comprises deflecting means for deflecting the water by at least 90°.

3. The surfing system according to claim 1, characterized in that the first wave generating device and the further wave generating device are arranged side by side.

4. The surfing system according to claim 3, characterized in that the first wave generating device and the further wave generating device are separated from one another by a partition wall.

5. The surfing system according to claim 1, characterized in that the at least one further wave generating device comprises a wave pool and a ramp arranged upstream of the wave pool, over which the water flows down into the wave pool.

6. The surfing system according to claim 1, characterized in that the wave pool of the first wave generation device and/or the wave pool of the at least one further wave generation device comprises an adjustable weir comprising a pivotable flap for adjusting the water level in the wave pool.

7. The surfing system according to claim 1, characterized in that the width and/or length of the wave pool of the at least one further wave generating device is less than the width or length of the wave pool of the first wave generating device.

8. The surfing system according to claim 1, characterized in that a backflow is arranged on both sides of the first wave generating device and in each case a further wave generating device is arranged in the backflow on both sides of the first wave generating device.

9. The surfing system according to claim 1, characterized in that an impact surface of the first wave generating device and/or the at least one further wave generating device is set obliquely with respect to the flow direction of the water circuit.

10. The surfing system according to claim 1, characterized in that the surfing system is made of snow.

* * * * *